United States Patent [19]

Underwood et al.

[11] Patent Number: 5,779,542
[45] Date of Patent: Jul. 14, 1998

[54] NYLATRON SUPPORT BEARING FOR CAGE

[75] Inventors: Mark Ray Underwood, Burr Oak; Sushil V. Dwyer, Arkansas City, both of Kans.

[73] Assignee: Deere & Company, Moline, Ill.

[21] Appl. No.: 753,294

[22] Filed: Nov. 22, 1996

[51] Int. Cl.$^6$ .................................................. A01F 12/58
[52] U.S. Cl. ........................... 460/69; 460/119; 460/150
[58] Field of Search .............................. 460/66, 67, 68, 460/69, 70, 94, 95, 119, 150, 116

[56] References Cited

U.S. PATENT DOCUMENTS

| | | | |
|---|---|---|---|
| 3,626,951 | 12/1971 | Jan Vogelenzang | 460/70 X |
| 4,249,542 | 2/1981 | Schuler | 460/67 |
| 4,353,376 | 10/1982 | Schuler | 460/67 |
| 5,562,540 | 10/1996 | Balmer | 460/68 X |

Primary Examiner—Terry Lee Melius
Attorney, Agent, or Firm—James E. Bradley

[57] ABSTRACT

A grain combine for threshing grain from crop has a threshing rotor within a rotor housing, a front plate with a crop entry hole, a stationary ring mounted on the rearward side of the front plate, a plastic bearing pad mounted on the outer surface of the stationary ring, and a rotating ring mounted to the forward end of the rotor housing which lands on the bearing pad, thereby supporting the rotor housing. The bearing pad has a soft, elastomeric inner layer adjacent to the stationary ring, and a hard, elastomeric outer layer adjacent to the rotating ring. In addition, the rotating ring has a plurality of holes that allow dirt or other foreign material to exit the rotor housing.

11 Claims, 2 Drawing Sheets

NYLATRON SUPPORT BEARING FOR CAGE

TECHNICAL FIELD

This invention relates in general to grain harvesting combines, and in particular to a support bearing for a rotor housing which surrounds the threshing rotor.

BACKGROUND ART

One type of grain harvesting combine conveys the cut crop into a threshing assembly at the front of the combine. The threshing assembly has a rotating rotor housing containing a rotating threshing rotor located rearward of a stationary entry plate. Both ends of the rotor and the rearward end of the rotor housing are supported by bearings on axial hubs. However, the forward end of the rotor housing cannot be supported with a central hub since there must be a wide annular opening between the rotor and the rotor housing for receiving the incoming crop.

In the prior art, the forward end of the rotor housing has typically been supported by equilaterally spaced wheels or rollers mounted between the rotating housing and the circular frame of the entry plate. This design provides vertical and horizontal stability for the rotor housing while preventing it from making contact with the frame of the thresher. However, this design also requires a significant number of moving parts, each of which requires lubrication and maintenance.

DISCLOSURE OF THE INVENTION

The grain combine of this invention has a threshing assembly which includes a threshing rotor within a rotor housing, a front plate with a crop entry hole, a stationary ring mounted on the rearward side of the front plate, a bearing pad mounted on the outer surface of the stationary ring, and a rotating ring which is mounted to the forward end of the rotor housing. By mounting the bearing pad to the outer surface of the stationary ring, the rotating ring is able to rotate and support the forward end of the rotor housing without the use of wheels or rollers between the rotating ring and the stationary ring.

The bearing pad has two layers: a soft, elastomeric inner layer adjacent to the stationary ring, and a hard, elastomeric outer layer adjacent to the rotating ring. The inner layer is designed to absorb vibration and to compensate for misalignment and thermal expansion of the adjacent parts. Since the rotating ring rides directly on the outer layer, a plastic material with a low coefficient of friction, preferably Nylatron, is used as a support bearing. In addition, the rotating ring has a plurality of holes that allow dirt or other foreign material to exit the interface between the bearing pad and the rotating ring.

BEST MODE FOR CARRYING OUT THE INVENTION

Figure 1:
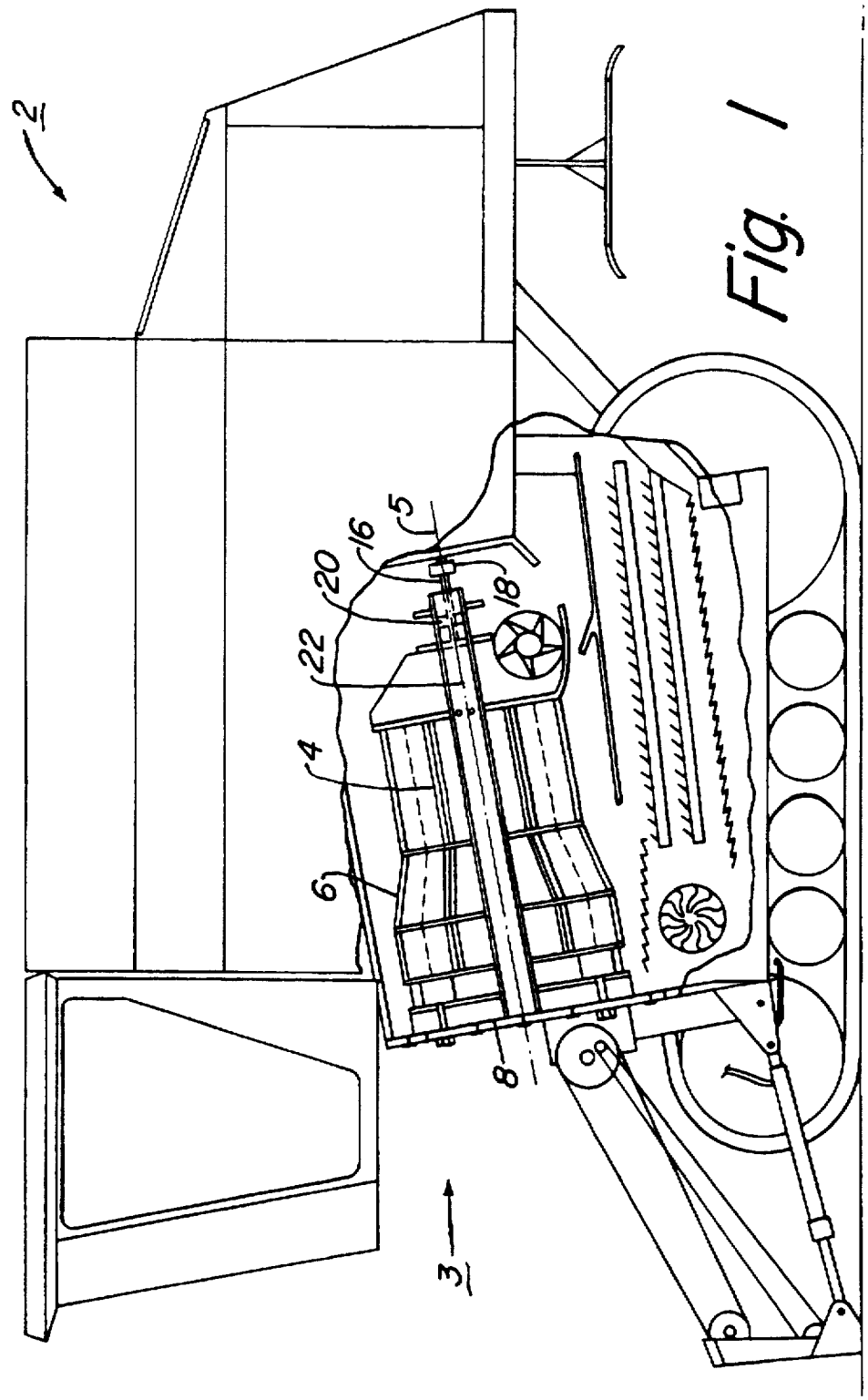
FIG. 1 is a schematic view of a combine showing the relative positions of the key elements of the invention with respect to the rest of the combine.

Referring to FIG. 1, a grain combine 2 with a threshing assembly 3 is shown. Threshing assembly 3 has a longitudinal axis 5 and a rotor housing 6 which surrounds a threshing rotor 4. Both rotor housing 6 and threshing rotor 4 rotate within threshing assembly 3 around longitudinal axis 5, although at different speeds. There is an annular space between rotor 4 and rotor housing 6 for receiving the incoming crop. The rearward ends of rotor 4 and rotor housing 6 are supported by an axial hub 16. Rotor 4 and rotor housing 6 rotate on bearing 18 and bearing 20, respectively. The forward end of rotor 4 is supported by another axial hub and bearing (not shown) supported by a front plate 8. Front plate 8 is perpendicular to longitudinal axis 5. Side arms 22 extend laterally alongside rotor housing 6 and provide structural support to threshing assembly 3.

Figure 2:
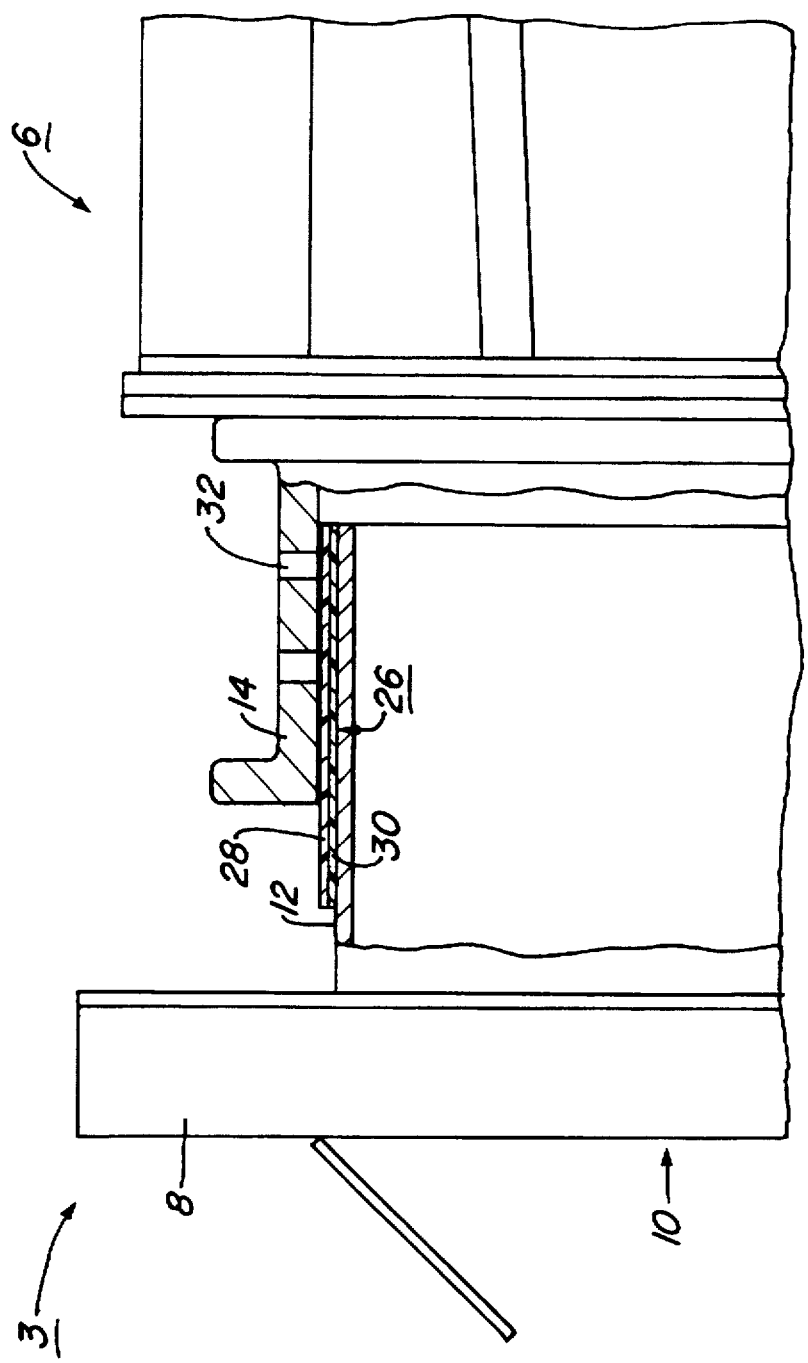
FIG. 2 is a partial sectional view of the upper portion of a thresher constructed in accordance with the invention.

Referring to FIG. 2, front plate 8 has a large circular opening 10 on the forward end of threshing assembly 3. Opening 10 extends through front plate 8 and receives crops for threshing assembly 3 from a conveyor (not shown). A stationary ring 12 extends rearward from front plate 8 into a forward portion or rotating ring 14 of rotor housing 6. Both stationary ring 12 and rotating ring 14 are concentric about longitudinal axis 5, and rotating ring 14 has a metallic inner side. The weight and motion of rotating ring 14 and, thus, rotor housing 6 are supported by stationary ring 12.

A thin cylindrical bearing pad 26 is mounted between rotating ring 14 and stationary ring 12. Bearing pad 26 is stationarily mounted on stationary ring 12 and essentially covers the entire outer surface of stationary ring 12. In its preferred embodiment, bearing pad 26 is composed of two layers: a soft, elastomeric inner layer 30 adjacent to stationary ring 12, and a hard, elastomeric outer layer 28 adjacent to rotating ring 14. Inner layer 30 is designed to absorb vibration and to compensate for misalignment and thermal expansion of the adjacent parts. Since rotating ring 14 rides directly on outer layer 28, a plastic material with a low coefficient of friction, preferably Nylatron, is used as a support bearing. Inner layer 30 and outer layer 28 may be secured to each other and to stationary ring 12 with an adhesive.

Rotating ring 14 also has a plurality of relief holes 32. Relief holes 32 extend radially through rotating ring 14 and allow dirt or other foreign matter or debris, which occasionally enters an interface between bearing pad 26 and rotating ring 14, to fall away. Relief holes 32 also allow heat to dissipate from the outer layer 28.

In operation, crops are conveyed from the field and into an opening 10 in a front plate 8 on threshing assembly 3. Inside threshing assembly 3, both threshing rotor 4 and rotor housing 6 are rotating. Rotating ring 14 rotates on stationary ring 12, while outer layer 28 slidingly engages metal rotating ring 14.

The invention has a number of advantages. By eliminating the need for wheels or rollers, the invention is more economical than those in the prior art and requires less service, such as lubrication and maintenance of moving parts. Providing holes in the rotating ring allows dirt and other foreign matter to escape from the interface between the rotating ring and the bearing, there again reducing the maintenance required for the threshing assembly. The holes also allow heat to escape from the threshing assembly more readily.

While the invention has been shown in only one of its forms, it should be apparent to those skilled in the art that it is not so limited, but is susceptible to various changes without departing from the scope of the invention.

We claim:

1. An improved grain combine having a threshing rotor which rotates within a rotor housing to thresh grain from crop, the rotor housing rotating relative to the threshing rotor, and a front plate having an opening for receiving crop into an annular space between the threshing rotor and the rotor housing, the improvement comprising in combination:

a stationary ring rigidly mounted to a rearward side of the front plate around the opening;

a rotating ring rigidly mounted to a front edge of the rotor housing and overlapping the stationary ring; and a bearing pad located between the stationary ring and the rotating ring.

2. The grain combine of claim 1 wherein the bearing pad is cylindrical.

3. The grain combine of claim 1 wherein the bearing pad is cylindrical and elastomeric.

4. The grain combine of claim 1 wherein the bearing pad further comprises:

an inner layer fixedly mounted to the outer surface of the stationary ring;

an outer layer fixedly mounted to the inner layer; and wherein the inner layer and the outer layer are elastomeric and the inner layer is substantially more flexible than the outer layer.

5. The grain combine of claim 1 wherein the rotating ring has a plurality of relief holes formed therein.

6. The grain combine of claim 1 wherein the rotating ring has an inner surface which slidingly engages the bearing pad on the stationary ring to support the front end of the rotor housing.

7. The grain combine of claim 1 wherein the bearing pad is secured to an outer surface of the stationary ring and the rotating ring has an inner surface which slidingly engages the bearing pad on the stationary ring to support the front end of the rotor housing.

8. In a grain combine having a threshing rotor which rotates within a rotor housing to thresh grain from crop, the rotor housing rotating relative to the threshing rotor, and a front plate having an opening for receiving crop into an annular space between the threshing rotor and the rotor housing, comprising in combination:

a cylindrical stationary ring rigidly mounted to a rearward side of the front plate around the opening;

a cylindrical bearing pad fixedly mounted to an outer surface of the stationary ring; and a rotating ring rigidly mounted to a front edge of the rotor housing, the rotating ring having an inner surface which slidingly engages the bearing pad on the stationary ring to support the front end of the rotor housing.

9. The grain combine of claim 8 wherein the rotating ring has a plurality of relief holes formed therein.

10. The grain combine of claim 8 wherein the bearing pad further comprises:

an inner layer fixedly mounted to the outer surface of the stationary ring;

an outer layer fixedly mounted to the inner layer; and wherein the inner layer and the outer layer are elastomeric and the inner layer is substantially more flexible than the outer layer.

11. In a grain combine having a threshing rotor which rotates within a rotor housing to thresh grain from crop, the rotor housing rotating relative to the threshing rotor, and a front plate having an opening for receiving crop into a space between the threshing rotor and the rotor housing, comprising in combination:

a cylindrical stationary ring rigidly mounted to a rearward side of the front plate around the opening;

a cylindrical bearing pad having an inner layer fixedly mounted to an outer surface of the stationary ring;

the bearing pad having an outer layer fixedly mounted to the inner layer, the inner layer and the outer layer being elastomeric, and the inner layer being substantially more flexible than the outer layer;

a rotating ring rigidly mounted to a front edge of the rotor housing, the rotating ring having an inner surface which slidingly engages the outer layer of the bearing pad to support the front end of the rotor housing; and wherein the rotating ring has a plurality of relief holes formed therein.

\* \* \* \* \*